May 28, 1935.  L. H. JOHNSON  2,002,604
STEERING DEVICE FOR TRAILERS
Filed Sept. 21, 1934   3 Sheets-Sheet 1
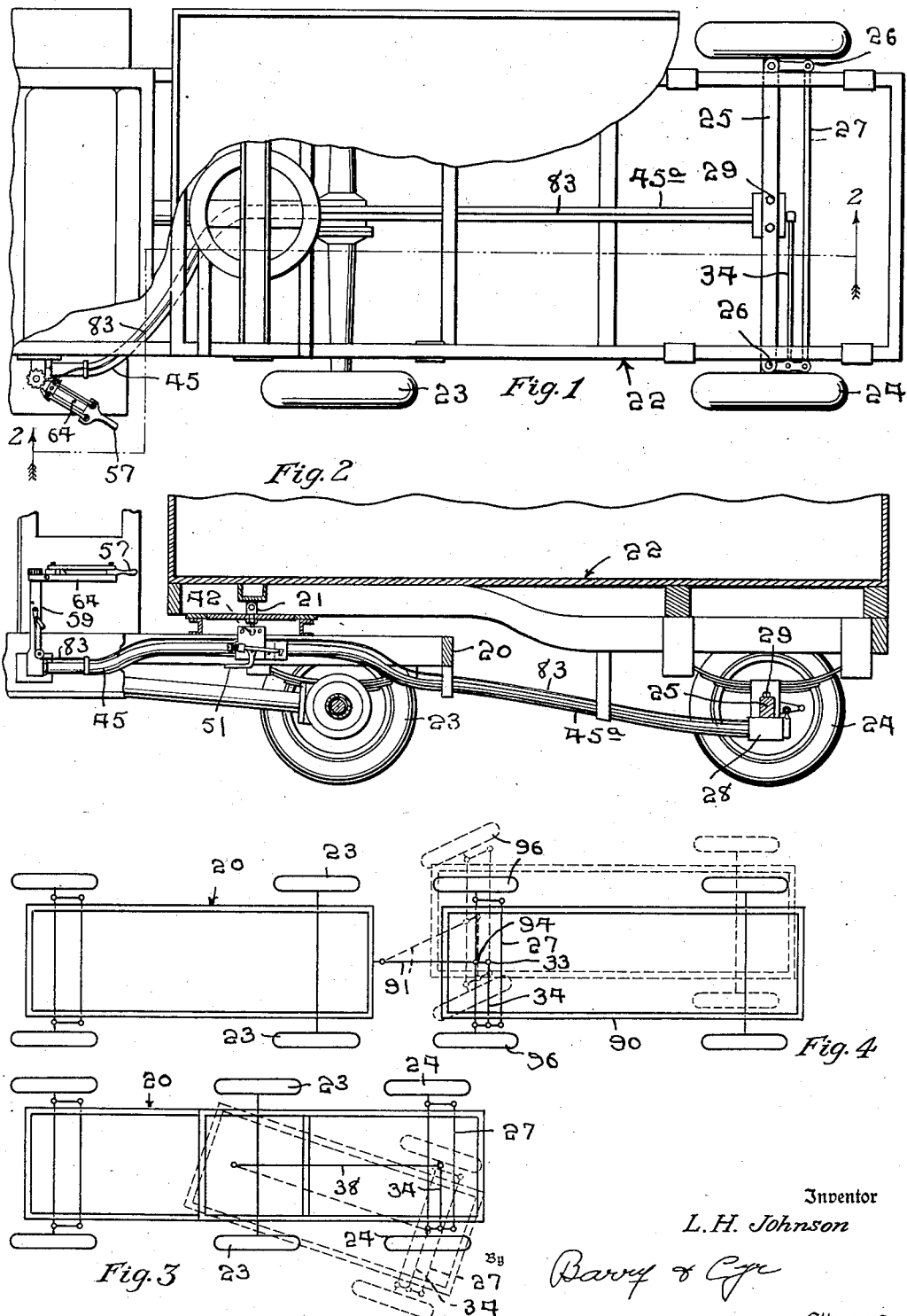
Inventor
L. H. Johnson
Attorneys May 28, 1935. L. H. JOHNSON 2,002,604
STEERING DEVICE FOR TRAILERS
Filed Sept. 21, 1934   3 Sheets-Sheet 2
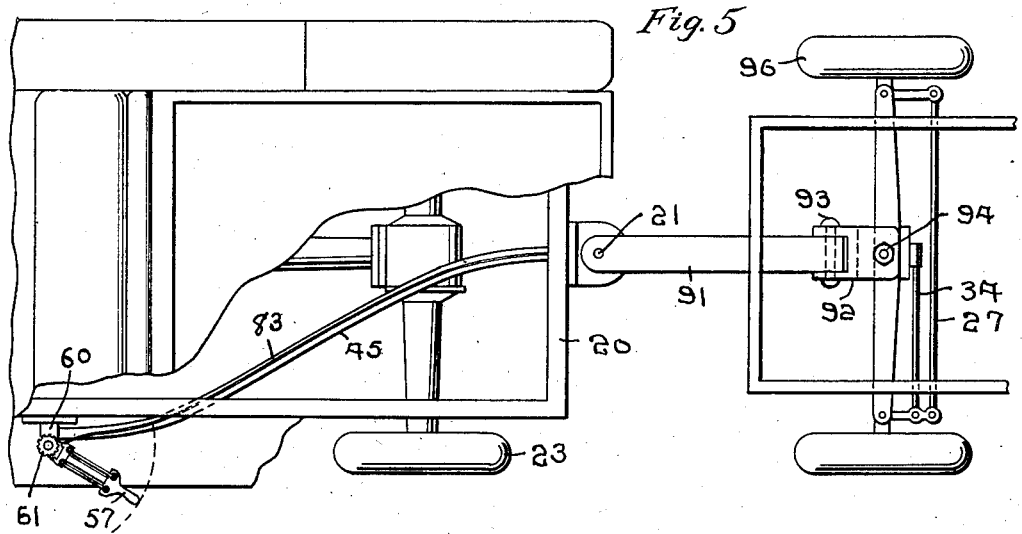
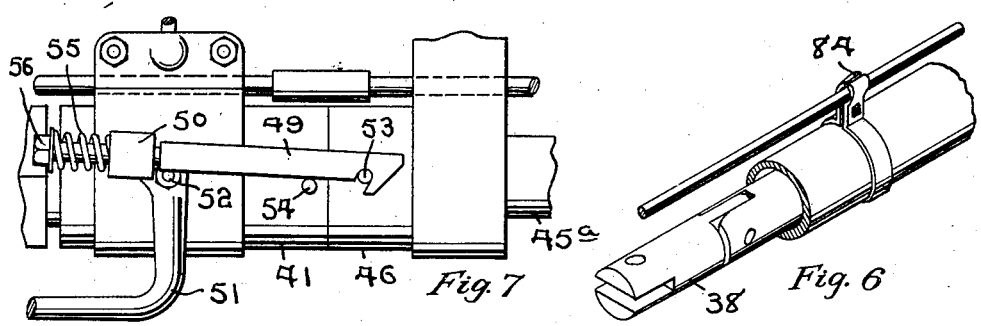
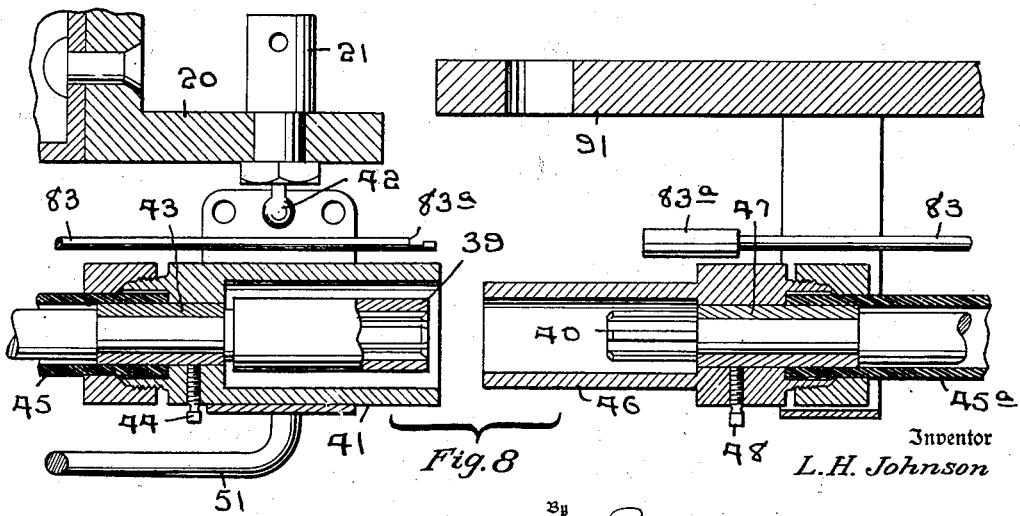
Inventor
L. H. Johnson
By Barry & Cyr
Attorneys May 28, 1935. L. H. JOHNSON 2,002,604
STEERING DEVICE FOR TRAILERS
Filed Sept. 21, 1934 3 Sheets-Sheet 3
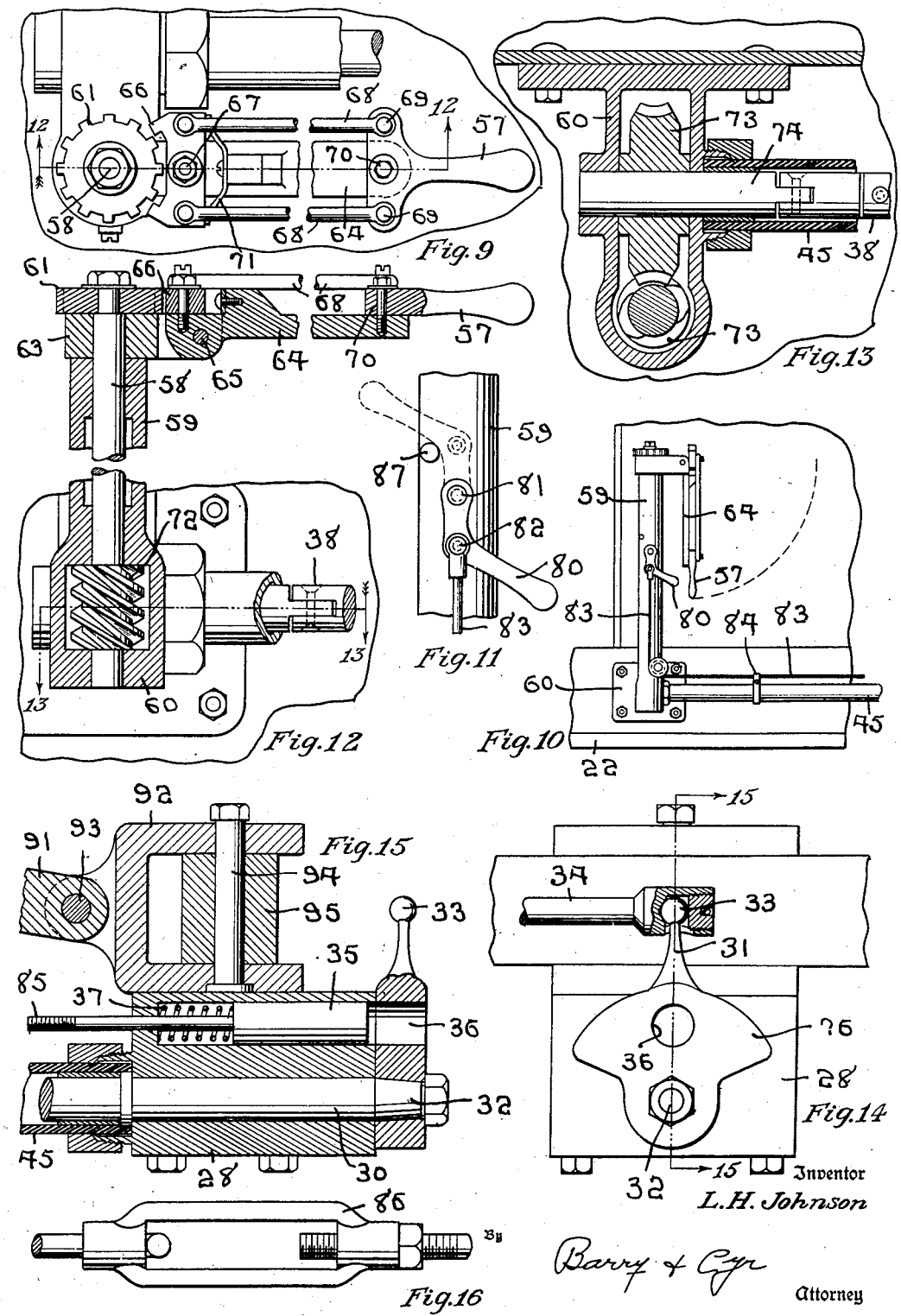
Inventor
L. H. Johnson
Barry & Cyr
Attorney Patented May 28, 1935

2,002,604

UNITED STATES PATENT OFFICE 2,002,604

STEERING DEVICE FOR TRAILERS

Louis H. Johnson, San Antonio, Tex., assignor to Southern Equipment Company, San Antonio, Tex., a corporation of Texas Application September 21, 1934, Serial No. 744,979

19 Claims. (Cl. 280—33.55)

This invention relates to improvements for motor trailers and has for its object to provide an improved steering device for use on either two or four-wheel trailers.

A further object of the invention is the provision of a steering device for changing the angular position of the wheels of a trailer to facilitate convenient maneuvering thereof.

Another object is to provide an arrangement whereby the steering movements of the trailer may be controlled from the motor vehicle employed for propelling the trailer.

A still further object of the invention is the provision of improved coupling devices connecting the motor vehicle with the trailer and also the manually operable steering device of the motor car with the wheels of the trailer.

With the foregoing objects outlined and with other objects in view which will appear as the description proceeds, the invention consists in the novel features hereinafter described in detail, illustrated in the accompanying drawings and more especially pointed out in the appended claims.

Fig. 1 is a top plan view, partly broken away, of a two-wheel trailer and a fragmentary view of the rear part of a motor vehicle to which it is coupled and illustrating the invention applied thereto.

Fig. 2 is a vertical central sectional view through the arrangement shown in Fig. 1 taken on line 2—2.

Figs. 3 and 4 are diagrammatic plan views of trailers of the two and four-wheel types, respectively, coupled with motor vehicles.

Fig. 5 is a fragmentary top plan view of the rear portion of a motor vehicle coupled with a trailer of the four-wheel type of which latter only the front part of the chassis and the front wheels are illustrated.

Fig. 6 is a fragmentary perspective of the flexible shaft for operating the wheels of the trailer.

Fig. 7 is a fragmentary side elevation of the trailer coupling.

Fig. 8 is a vertical sectional view through the detached members of the coupling.

Fig. 9 is a fragmentary top plan view of the steering arm and associated parts.

Fig. 10 is a side elevation of the mechanism shown in Fig. 9.

Fig. 11 is a fragmentary enlarged elevation of a steering column.

Fig. 12 is a section on the line 12—12 of Fig. 9.

Fig. 13 is a section on the line 13—13 of Fig. 12.

Fig. 14 is an enlarged rear elevation, shown in section, of the trailer axle showing parts of the steering mechanism connected therewith.

Fig. 15 is a vertical section on the line 15—15 of Fig. 14.

Fig. 16 is an elevation of the turn buckle connecting the pull rod with the locking plunger for the steering arm.

Referring to the drawings in detail and more particularly to the two-wheel type of trailer illustrated in Figs. 1, 2 and 3, the numeral 20 indicates the chassis of a motor car used for propelling the trailer. The chassis is provided with a coupling pin 21 connecting the forward end of the two-wheel trailer 22 with a motor vehicle preferably at a point forwardly of the rear wheels 23 thereof.

According to the invention the supporting wheels 24 of the trailer are coupled with the axle 25 thereof by knuckle joints 26 permitting said wheels to turn about vertical axes for steering purposes. The steering knuckles are coupled by a tie rod 27 whereby the wheels 24 are caused to perform similar steering movements.

A bearing block 28 shown in Figs. 14 and 15 is rigidly bolted at 29 to the rear axle 25 and supports a rotatable shaft 30 to which a steering arm 31 is rigidly secured at 32. The spherical end 33 of the arm 31 is connected by a coupling rod 34 with the arm of one of the knuckle joints 26 whereby the swinging movement of the arm 31 is transmitted to the wheels 24 for effecting steering movements thereof.

The arm 31, however, is normally locked against turning movement by means of a plunger 35 engaging in an aperture 36 in said arm and normally urged rearwardly into said aperture by a spring 37. Being thus locked against swinging movement, the stationary arm 31 prevents turning of the wheels 24 about the vertical axes of the knuckle joints 26 and during the normal travel of the two-wheel type of trailer, the wheels 24 thereof merely track the wheels of the motor vehicle.

When the arm 31 is released by withdrawal of the plunger 35, it may be turned by the two sections of a flexible shaft 38 connected by the shaft coupling means 39 and 40 (Fig. 8) carried, respectively, by the motor vehicle 20 and the trailer 22. The coupling member 39 is rotatable in a housing 41 pivotally connected at 42 with the chassis 20 at a point in vertical line with the coupling pin 21 whereby the housing 41 may turn relatively thereto. The coupling member 39 is held against axial displacement in the housing 41 by a two-part thrust sleeve 43 held in position by a screw 44. The portion of the flexible shaft 38 extending forwardly from the coupling member 39 is enclosed in a flexible tube 45 and is connected at its forward extremity with the manually controlled steering arm to be hereinafter more fully described.

The coupling member 40 is provided with external longitudinal ribs adapted to fit in the corresponding shape interior of the coupling member 39 when the two members are slid together. The coupling member 40 is enclosed by a housing 46 of tubular form and projecting a substantial distance beyond the coupling member 40. The housing 46 is adapted to telescope within the housing 41 and constitutes a guide for moving the coupling members 39 and 40 into alignment to facilitate coupling thereof. The coupling member 40 is rotatably mounted in the housing 46 and is also held against axial displacement by a thrust bushing 47 held in place by a screw 48. The shank of the coupling member 40 is connected with the shaft 30 by means of a second part of the flexible shaft 38 mounted in a tubular housing 45a.

The coupling housings are locked in coupled relation by means of hooks 49 one of which is mounted on either side of the housing 41 and is supported for sliding movement in a lug 50 carried by a hand lever 51 pivotally secured at 52 to the side of the housing 41. As shown in Fig. 7, the free end of each hook 49 is adapted to engage over a pin 53 carried by the other housing 46, the movement of the hook 49 being limited by a stop pin 54 fixed to the housing member 41. As stated, each hook 49 is slidable in the lug 50 and a spring 55 is confined between said lug and a nut 56 fitting on the end of the hook. In this manner each hook is resiliently retained in engagement with its pin 53.

Referring to Figs. 9 to 12 inclusive, the manually operable arm 57 by means of which the steering movement of the trailer wheels 24 is controlled, is arranged on the motor vehicle 20 used for propelling the trailer and is rotatably mounted on a shaft 58, the latter being rotatably mounted in an upright column 59 rigidly secured in a suitable bracket 60 attached to said motor vehicle. A toothed wheel 61 is rigidly secured to the upper extremity of the shaft 58 and between the latter and the upper end of the column 59 a holder 63 is rotatably mounted. The lever 64 carrying the steering handle 57 is pivotally mounted at 65 on the holder 63, the axis 65 of the swinging movement of the arm 64 being disposed perpendicularly to the shaft 58. When the steering gear for the wheels of the trailer is not in use, the arm 64 is swung downward about the pivot 65 to the position shown in Fig. 10 in which it occupies less space and remains uncoupled from the shaft 58.

A double-acting pawl 66 is pivotally mounted at 67 on the lever 64 and the opposite ends thereof are connected by rods 68 with the opposite lugs 69 carried by the inner end of the handle 57 which latter is pivotally secured at 70 to the lever 64. The double-acting pawl 66 is normally held in a neutral or inoperable position by the tension of a spring 71 and as shown in Fig. 9, the teeth thereof are displaced from the teeth of the wheel 61. However, when the handle 57 is turned in one direction or the other, it turns to a limited angle about the pivot 70 and the turning movement thereof is transmitted through rods 68 to the pawl thereby bringing one or the other of the two teeth thereof into engagement with the teeth of the wheel 61. Continued movement of the handle 57 is transmitted to the lever 64 and through the pawl 66 to the wheel 61 and shaft 58. When the force applied to the handle 57 is relieved, the pawl 66 is restored to inoperative position by the spring 71.

The lower extremity of the shaft 58 is provided with a worm 72 meshing with a worm wheel 73 secured to a shaft 74 rotatably supported in a horizontal position in the lower portion of the column 57. The shaft 74, as shown in Fig. 13, is coupled with the forward extremity of the flexible shaft 38 located in the flexible housing 45 whereby the rotary movement of the manually controlled shaft 58 is transmitted to the steering arm 31 through the worm and wheel 72, 73, shaft 74, flexible shaft 38, coupling means 39 and 40, flexible shaft 38a and shaft 30.

As shown in Fig. 14, the arm 31 is provided at the pivoted end thereof with arcuate enlargements 76 which, when the opening 36 is moved out of register with the plunger 35, retains the latter in retracted position throughout the entire range of angular movement of the arm 31.

A plunger-actuating lever 80 is pivotally mounted at 81 on the column 59 and is connected at 82 with a pull rod 83 as shown in detail in Fig. 11. When the lever 80 is swung upwardly to the position shown in dotted lines, a pull is exerted on the rod 83 and the latter being movably mounted in guides 84 attached to the tubular housings 45 and 45a, is connected at its rear end to the shank 85 of the plunger 35 by a turn buckle 86. When the lever 80 is swung to the dotted line position to retract the plunger 35, it rests against a stop pin 87 carried by the column 59 and is held in this position by the tension of the spring 37.

The rod 83 is formed in two parts, the adjacent ends of which terminate at the coupling housings 41 and 46 and are detachably connected by a suitable coupling 83a, as shown in Fig. 8.

In the use of the two-wheel trailer, the lever 80 is swung downwardly permitting the plunger 35 to enter the opening 36 whereby the arm 31 together with the rod 34 and steering knuckles 26 are locked against movement and the wheels of the trailer track those of the motor car 20 in the usual manner. When it is desired to maneuver the trailer with relation to the vehicle 20, as, for instance, in the case of parking it in a limited space, the plunger 35 is withdrawn from the opening 36 by lifting the lever 80 and thereby releasing the arm 31 and the lever 64 is raised to its horizontal position. The handle 57 is grasped and swung in one direction or the other depending on the desired steering movement of the wheels 24 and in so doing one or the other of the teeth of the double pawl 66 is engaged with the teeth of the wheel 61 and the swinging movement of the lever 64 and handle 57 about the shaft 58 is transmitted to the latter and to the steering knuckles 26 through the worm 72, wheel 73, shaft 74, flexible shaft 38, coupling members 39 and 40, flexible shaft 38a, shaft 30, arm 31 and rods 34 and 27. To restore the parts to initial position, the lever 80 is swung downwardly thereby permitting the plunger 35 to enter the opening 36 under the influence of the spring 37 and the lever 64 is swung downwardly to its inoperative position.

The steering device for the four-wheel type of trailer is similar to that used for the two-wheel type with the exception that the chassis 90 of the trailer is connected with the pin 21 of the motor car by means of a tongue 91. According to this form of the invention, the bearing block 28 instead of being fastened rigidly to the underside of the trailer axle, is attached to a clevis 92 pivotally connected at 93 to the tongue 91 and pivotally secured by a pin 94 to the front trailer axle 95. As in the first described form of the invention, the plunger 35 is normally positioned on the opening 36 and the bearing block and arm 31 are thus locked together. However, when the tongue 91 is moved into angular position with reference to the longitudinal axis of the trailer chassis as when the motor vehicle 20 is turning, the bearing block 28 is turned with the tongue 91 about the pin 94 and the pull or push exerted on the rod 34 is transmitted to the steering knuckles 26 and the front wheels 96 of the trailer are turned in the same direction in which the motor vehicle 20 is being guided. The position which the front wheels 96 assume when the tongue 91 is turned about the pin 94 is indicated in dotted lines in Fig. 4.

When it is desired to impart steering movements to the wheels 96 independently of the tongue 91 for the purpose of maneuvering the trailer independently of the movement of the motor vehicle 20, the lever 80 is raised thereby retracting the plunger 35 and permitting the wheels 96 to be adjusted by means of the lever 64 and handle 57.

From the foregoing it is believed that the construction of my improved apparatus may be clearly understood, and it is manifest that changes may be made in the details outlined without departing from the spirit of the invention as expressed in the claims.

What I claim and desire to secure by Letters Patent is:

1. In combination, a trailer chassis, supporting wheels for said chassis mounted for steering movements, a rotatable shaft carried by said chassis, means for imparting movement of said shaft to said wheels for effecting steering movement thereof, and releasable means normally engaging said last mentioned means for locking said shaft against rotation.

2. In combination, a trailer chassis, supporting wheels for said chassis mounted for steering movements, a rotatable shaft carried by said chassis, means for imparting movement of said shaft to said wheels for effecting steering movement thereof, and releasable means to lock said shaft against rotation, a motor vehicle, a draft coupling between the trailer chassis and said motor vehicle, a manually operable steering member mounted on said motor vehicle, and separable coupling members connecting the manually operable member with said shaft.

3. In combination, a trailer chassis, supporting wheels for said chassis mounted for steering movements, a rotatable shaft carried by said chassis, means for imparting movement of said shaft to said wheels for effecting steering movement thereof, and releasable means to lock said shaft against rotation, a motor vehicle, a draft coupling between the trailer chassis and said motor vehicle, a manually operable steering member mounted on said motor vehicle, and separable coupling members connecting the manually operable member with said shaft at a point adjacent said draft coupling.

4. In combination, a trailer chassis, supporting wheels for said chassis mounted for steering movements, a rotatable shaft carried by said chassis, means for imparting movement of said shaft to said wheels for effecting steering movement thereof, and releasable means to lock said shaft against rotation, and means to impart steering movement to said wheels independently of said shaft.

5. In combination, a trailer chassis, supporting wheels for said chassis mounted for steering movements, a rotatable shaft carried by said chassis, means for imparting movement of said shaft to said wheels for effecting steering movement thereof, and releasable means to lock said shaft against rotation, and means to impart steering movement to said wheels independently of said shaft, said means including a coupling tongue pivotally connected with said chassis and adapted for connection with a propelling vehicle.

6. In combination, a trailer chassis, supporting wheels for said chassis mounted for steering movements, a rotatable shaft carried by said chassis, means for imparting movement of said shaft to said wheels for effecting steering movement thereof, and releasable means to lock said shaft against rotation, a motor vehicle, a draft coupling between the trailer chassis and said motor vehicle, a manually operable steering member mounted on said motor vehicle, and separable coupling members connecting the manually operable member with said shaft, and a second manually operable member connected with said locking means for moving the latter to operative position.

7. In combination, a two wheel trailer including a chassis and supporting wheels therefor mounted for steering movements, a rotatable shaft, swinging means for imparting rotary movement of said shaft to said wheels for effecting steering movement thereof, and means engageable with said last mentioned means for locking said shaft against rotation to prevent steering movement of said wheels.

8. In combination, a two wheel trailer including a chassis and supporting wheels therefor mounted for steering movements, a rotatable shaft, means for imparting rotary movement of said shaft to said wheels for effecting steering movement thereof, and means to lock said shaft against rotation to prevent steering movement of said wheels, and separate manually operable means for operating said shaft and for controlling said locking means.

9. In combination, a four-wheel trailer including a chassis and supporting wheels therefor, certain of said wheels being mounted for steering movements, a draft tongue pivotally connected with said chassis, a rotatable shaft supported by said tongue and movable with the tongue about the axis of the pivotal connection, and means for imparting movement of said shaft to the steering wheels, and means to lock said shaft against rotary movement whereby the steering movements of said wheels are effected solely by the swinging movement of the draft tongue.

10. In combination, a four-wheel trailer including a chassis and supporting wheels therefor, certain of said wheels being mounted for steering movements, a draft tongue pivotally connected with said chassis, a rotatable shaft supported by said tongue and movable with the tongue about the axis of the pivotal connection, and means for imparting movement of said shaft to the steering wheels, and means to lock said shaft against rotary movement whereby the steering movements of said wheels are effected solely by the swinging movement of the draft tongue, and separate manually operable members for operating said shaft and for controlling said locking means.

11. In combination, a motor vehicle, a trailer coupled with said vehicle and including a chassis and supporting wheels mounted for steering movements, means for imparting steering movement to said wheels including a shaft rotatable on said chassis, means to lock said wheels against steering movements, a manually operable steering member carried by said motor vehicle, a flexible two-part shaft, one part of the shaft being connected with the manually operable member and the other part thereof being connected with the first mentioned shaft, and a separable coupling between the parts of said flexible shaft.

12. In combination, a motor vehicle, a trailer coupled with said vehicle and including a chassis and supporting wheels mounted for steering movements, means for imparting steering movement to said wheels including a shaft rotatable on said chassis, means to lock said wheels against steering movements, a manually operable steering member carried by said motor vehicle, a flexible two-part shaft, one part of the shaft being connected with the manually operable member and the other part thereof being connected with the first mentioned shaft, and a separable coupling between the parts of said flexible shaft, said separable coupling including telescopic housing members carried respectively by the motor vehicle and said chassis and telescoping coupling members arranged within the housing and carried respectively by the parts of said flexible shaft, and means to releasably couple the housing members.

13. In combination, a motor vehicle, a trailer including a chassis and supporting wheels mounted for steering movements, a pivotal coupling between said chassis and said motor vehicle, a shaft rotatably mounted in said chassis, means for imparting rotary movement of said shaft to said wheels for effecting steering movement thereof, means to lock said wheels against steering movements, a manually operable member on said motor vehicle, a two-part flexible shaft having the parts thereof connected respectively with said manually operable member and the first mentioned shaft, telescopic coupling housings, one of said housings being connected with the trailer, means pivotally connecting the other housing for movement about the axis of said pivotal coupling, and shaft coupling members arranged within said housings and connected respectively with the parts of the flexible shaft.

14. In combination, a trailer including a chassis and supporting wheels therefor mounted for steering movements, a bearing member carried by said chassis, a shaft rotatable in said bearing member, an arm actuated by said shaft, means transmitting movement of said arm to said wheels, and means engageable with said arm to lock said arm together with said wheels against steering movements.

15. In combination, a motor vehicle, a trailer coupled with said motor vehicle, said trailer including a chassis and supporting wheels therefor mounted for steering movements, a shaft carried by said chassis, means for imparting movement of said shaft to said wheels for effecting steering movement thereof, and a steering device mounted on said motor car and coupled with said shaft, said steering device including a column, a shaft mounted therein, a steering lever mounted for pivotal movement about two axes, and a manually operable member for coupling said lever with said shaft for imparting rotary movement to the latter.

16. In combination, a motor vehicle, a trailer coupled with said motor vehicle, said trailer including a chassis and supporting wheels therefor mounted for steering movements, a shaft carried by said chassis, means for imparting movement of said shaft to said wheels for effecting steering movement thereof, and a steering device mounted on said motor car and coupled with said shaft, said steering device including a column, a shaft mounted therein, a steering lever mounted for pivotal movement about two axes, and a manually operable means for coupling said lever with said shaft for imparting rotary movement to the latter, the last mentioned means including a double-acting pawl and a toothed wheel carried by said shaft.

17. In combination, a motor vehicle, a trailer coupled with said motor vehicle, said trailer including a chassis and supporting wheels therefor mounted for steering movements, a shaft carried by said chassis, means for imparting movement of said shaft to said wheels for effecting steering movement thereof, and a steering device mounted on said motor car and coupled with said shaft, said steering device including a column, a shaft mounted therein, a steering lever mounted for pivotal movement about two axes, and a manually operable member for coupling said lever with said shaft for imparting rotary movement to the latter, and a member mounted on said column for controlling said locking means.

18. In combination, a motor vehicle, a trailer coupled therewith and including a chassis and supporting wheels mounted for steering movements, a shaft carried by the chassis, means for imparting movement of the shaft to said wheels for effecting steering movements thereto, means to lock said wheels against steering movements, a manually controlled steering device mounted on said motor vehicle, means connecting said steering device to said shaft, said connecting means including separable coupling members permitting the trailer to be detached from said vehicle, a manually operable member on said steering device, and means connecting said member with said locking means, the last mentioned connecting means also including separable means.

19. In combination, a trailer chassis, supporting wheels for said chassis mounted for steering movements, a rotatable shaft carried by said chassis, swinging means for imparting movement of said shaft to said wheels for effecting steering movement thereof, and a spring pressed plunger normally engaging said swinging means for locking said shaft against rotation.

LOUIS H. JOHNSON.